(12) United States Patent
Nishihata et al.

(10) Patent No.: US 6,657,005 B1
(45) Date of Patent: Dec. 2, 2003

(54) THERMOPLASTIC RESIN COMPOSITION

(75) Inventors: Naomitsu Nishihata, Fukushima-ken (JP); Shiro Arai, Fukushima-ken (JP); Chikau Onodera, Saitama-ken (JP); Masahito Tada, Fukushima-ken (JP)

(73) Assignee: Kureha Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,074

(22) PCT Filed: Apr. 20, 2000

(86) PCT No.: PCT/JP00/02585

§ 371 (c)(1),
(2), (4) Date: Oct. 18, 2001

(87) PCT Pub. No.: WO00/64984

PCT Pub. Date: Nov. 2, 2000

(30) Foreign Application Priority Data

Apr. 22, 1999 (JP) ............................................. 11-115271
Oct. 13, 1999 (JP) ............................................. 11-290608

(51) Int. Cl.[7] ................................................ C08L 51/00
(52) U.S. Cl. ............................. 525/64; 525/79; 525/70; 524/515
(58) Field of Search ........................... 524/515; 525/64, 525/79, 70

(56) References Cited

U.S. PATENT DOCUMENTS

| 4,315,081 | A | * | 2/1982 | Kobayashi et al. | ......... 524/141 |
| 5,151,457 | A | * | 9/1992 | Ishida et al. | ................. 524/157 |
| 5,182,338 | A | * | 1/1993 | Gaggar | ....................... 525/187 |
| 5,270,367 | A | * | 12/1993 | Nakazawa et al. | .......... 524/223 |
| 5,886,098 | A | * | 3/1999 | Ueda et al. | ................... 525/66 |
| 6,310,128 | B1 | * | 10/2001 | Hilti et al. | ................... 524/378 |

FOREIGN PATENT DOCUMENTS

| EP | 0 613 919 A1 | 9/1994 |
| JP | 56-120751 | 9/1981 |
| JP | 6-107894 | 4/1994 |
| JP | 10-7872 | 1/1998 |

* cited by examiner

*Primary Examiner*—David W. Wu
*Assistant Examiner*—Henry S Hu
(74) *Attorney, Agent, or Firm*—Wenderoth, Lind & Ponack, L.L.P.

(57) ABSTRACT

A thermoplastic resin composition is formed by mixing (A) 30–84.9 wt. % of a crystalline thermoplastic resin, (B) 15–65 wt. % of a graft copolymer obtained by graft-polymerizing an ethylenically unsaturated monomer onto a rubber trunk polymer having an alkylene oxide group and (C) 0.1–5 wt. % of an anionic surfactant. As a result, it is possible to obtain a non-black thermoplastic resin composition which shows an antistatic property at a level suitable for use as an ESD (electrical static dissipative) and can be colored into arbitrary hues.

11 Claims, No Drawings

THERMOPLASTIC RESIN COMPOSITION

TECHNICAL FIELD

The present invention relates to a non-black thermoplastic resin composition which can provide a shaped product showing a sufficiently short static decay time (time in which an applied voltage is attenuated to a prescribed voltage) and is suitable for use as an ESD (electrical static dissipative) material.

BACKGROUND ART

A synthetic resin having a surface resistivity of $10^6$ to $10^{11}$ ohm/square (ohm/□) is strongly desired as an ESD control material in a field of industry where static electricity has to be removed.

Hitherto, for providing anti-static synthetic resins, there have been used a method of surface-application of an antistatic agent or a silicone compound, and a method of shaping a composition containing an antistatic agent or a filler material having a low electrical resistivity.

Among the above, the method of surface-application of an antistatic agent or a silicone compound is accompanied with a practically great problem that the antistatic effect is markedly reduced by washing or rubbing.

On the other hand, the method of shaping a composition containing an antistatic agent as an additive is not sufficient for permanent static prevention and is accompanied with problems such that the antistatic effect is lost when the antistatic agent present at the surface is removed by washing with water or rubbing, and excessive bleeding to the surface of the antistatic agent not only causes adhesive sticking of refuse or dust but also is liable to soil the environment due to elution or vaporization of the antistatic agent. JP-B 59-2462 (corr. to GB-A 2070046) has disclosed a thermoplastic resin composition showing a permanent antistatic function obtained by adding an anionic surfactant to a thermoplastic resin containing a graft-copolymer based on a rubber trunk polymer having an alkylene oxide group, but the antistatic function is insufficient for use as an ESD control material.

In the method of shaping a composition containing a filler material having a low electrical resistivity, a mixture comprising a good-conductivity filler material having a low electrical resistivity, such as electroconductive carbon black, graphite, carbon fiber, metal fiber or metal powder, and a synthetic resin, is formed into a synthetic resin composition. In this case, as the electrical resistivities of the filler and the synthetic resin are remarkably different, the electrical resistivity of the resultant resin composition remarkably varies depending on a content of the filler. Particularly, in a surface resistivity range of ca. $10^6$–$10^{11}$ ohm/square of a resin composition, the electrical resistivity of a resin composition sharply varies depending on the filler content. Accordingly, it has been difficult to stably produce a synthetic resin composition having a surface resistivity of $10^6$–$10^{11}$ ohm/square. Among the above-mentioned good-conductivity filler materials, carbon materials such as electroconductive carbon black, graphite and carbon fiber, are suitably used for providing a surface resistivity in a range of $10^6$–$10^{11}$ ohm/square, but the application thereof is necessarily confined since the hue of the resultant resin composition is restricted to "black".

A principal object of the present invention is to provide a non-black thermoplastic resin composition which shows a sufficiently short static decay time for use as an ESD control material and can be colored into arbitrary hues.

DISCLOSURE OF INTENTION

According to our study, it has been found possible to accomplish the above-mentioned object by a non-black thermoplastic resin composition comprising: (A) 30–84.9 wt. % of a crystalline thermoplastic resin, (B) 15–65 wt. % of a graft-copolymer formed by graft-polymerizing an ethylenically unsaturated monomer onto a rubber trunk polymer having an alkylene oxide group and (C) 0.1–5 wt. % of an anionic surfactant. As a result, according to another aspect, it is possible to obtain a non-black thermoplastic resin composition providing a shaped article exhibiting a very short decay time from 5000 volts to 50 volts of at most 10 sec and a surface resistivity of at least 10 ohm/square.

Some history and details as to how we have arrived at the present invention as a result of study for achieving the above object, will now be briefly described.

It is understood that the excellent antistatic effect of the thermoplastic resin composition of the present invention relies on the function of the anionic surfactant selectively adsorbed onto the rubber trunk polymer of the graft copolymer (B). This is the same as in the antistatic resin composition disclosed in the above-mentioned JP-B 59-2462. The same JP-B 59-2462 also describes that a portion of the graft copolymer can be replaced with a thermoplastic resin compatible with the graft copolymer (A), and examples of the thermoplastic resin disclosed therein include some specific examples of crystalline thermoplastic resin used in the present invention. However, 31 compositions disclosed in Examples of the same JP-B 59-2462 exhibited a static decay time from 5000 volts to 50 volts and a surface resistivity which were larger by one digit or more than those of the composition of the present invention and failed to exhibit the necessary ESD property, according to our measurement (see Examples and Comparative Examples appearing hereinafter). Thus, the present invention corresponds to a selection invention which has succeeded in a remarkable improvement in ESD property by selecting a crystalline thermoplastic resin which has been included in examples of the thermoplastic resin compatible with the graft copolymer but not specially noted in the JP-B 59-2462.

There is one reason why a crystalline thermoplastic resin was not selectively used in combination with the graft copolymer in the JP-B 59-2462 unlike in the present invention. More specifically, the invention of the JP reference aimed at providing an antistatic resin composition having a good transparency as is understood from enumerated products or usage, such as covers of electrical appliances or accessories, as an object. (In fact, the compositions described in Examples are those exhibiting a whole-ray light transmittance of ca. 90% and a haze of ca. 3–5%). For such a viewpoint of transparency, it is preferred to use an amorphous thermoplastic resin having a better compatibility or an amorphous thermoplastic resin having a refractive index identical to that of the graft copolymer compared with a crystalline thermoplastic resin. A crystalline thermoplastic resin used in the present invention has a compatibility with the graft copolymer in a sense that it is thermally mixable with the graft copolymer but does not have a microscopic mutual solubility (miscibility or a good level of compatibility) with the graft copolymer sufficient to provide a good transparency. Accordingly, the resultant composition becomes semi-transparent, or milky-white, milky-yellow or milky brownish, but can be colored in arbitrary hues, of course, unlike the case of blending with carbon black. The thermoplastic resin composition of the present invention may be referred to as an invention which has been arrived at by parting from the transparency, an objective property aimed at by the invention of the above JP reference.

The reason why a remarkable improvement in ESD property compared with not only the case of using an amorphous thermoplastic resin but also the case of combining a graft copolymer (B) alone with an anionic surfactant (C), has not been clarified as yet, but it is at least believed to be certain that a crystal reproduced in the course of shaping and cooling after thermal mixing of a crystalline thermoplastic resin and a graft copolymer, is deeply concerned with development of the ESD property. It is also presumed that the added anionic surfactant (C) is not mutually soluble with such a reproduced crystal but is preferentially adsorbed onto the rubber trunk polymer of the graft copolymer (B) or the anionic surfactant (C) is present at the crystal boundaries, to contribute to the development of the ESD property.

BEST MODE FOR PRACTICING THE INVENTION

Crystalline Thermoplastic Resin (A)

The crystalline thermoplastic resin (A), as a first characterizing component of the thermoplastic resin composition of the present invention, may preferably be one exhibiting a heat-adsorption peak based on a crystal melting point showing a crystal melting enthalpy ($\Delta Hc$) of at least 10 J/g, particularly at least 15 J/g, when measured at a temperature-raising rate of 10° C./min. in a nitrogen atmosphere by using a differential scanning calorimeter (DSC). Particularly, it is preferred to use one showing a melting point (Tm) of at most 300° C., further preferably at most 290° C. A resin having a higher melting point is liable to thermally degrade an anionic surfactant (C) in the stage of kneading with the anionic surfactant (C) described hereinafter.

Specific examples of the crystalline thermoplastic resin (A) may include: crystalline polyamide resins, such as polyamide 6, polyamide 66 and polyamide 46; crystalline polyester resins, such as polybutylene terephthalate and polyethylene terephthalate; polyphenylene sulfide, polyacetal, polyethylene, polypropylene, totally aromatic polyesters; fluorine-containing resins, such as polyvinylidene fluoride, and tetrafluoroethylene/hexafluoropropylene copolymer; and modified products of these. It is also possible to use a mixture of two or more species selected from synthetic resins as mentioned above.

The content of the crystalline thermoplastic resin (A) in the thermoplastic resin composition is in the range of 30–84.4 wt. %, preferably 30–79.9 wt. %. If the content of the thermoplastic resin (A) is excessively large, the static decay time becomes longer, thus failing to provide a resin composition showing a sufficient antistatic function. If the content of the crystalline thermoplastic resin is excessively small, the desired ESD property-development effect becomes scarce, and the thermoplastic resin composition is liable to have a lower elastic modulus and the processing thereof as by injection molding or extrusion is liable to become difficult in some cases.

Graft Copolymer (B)

The graft copolymer (B), as a second component of the thermoplastic resin composition according to the present invention, has a rubber trunk polymer and preferably comprise a graft copolymer formed by graft-copolymerizing an ethylenically unsaturated monomer onto a rubber trunk polymer having an alkylene oxide group. It is particularly preferred to use a graft copolymer which is basically similar to the one described in the above-mentioned JP-B 59-2462.

More specifically, the rubber trunk polymer preferably used for constituting the graft copolymer of the present invention is a rubbery copolymer comprising: 50–95 wt. % of at least one monomer selected from conjugated dienes and acrylate esters, 5–50 wt. % of at least one monomer having 4–500 alkylene oxide groups and an ethylenically unsaturated bond (hereinafter referred to as a "polyalkylene oxide monomer"), and optionally 0–50 wt. %, preferably 0–40 wt. %, of one or more copolymerizable ethylenically unsaturated monomers.

The rubber trunk polymer may principally comprise at least one monomer selected from conjugated dienes and acrylate esters. The conjugated dienes may include: 1,3-butadiene, isoprene, chloroprene, 1,3-pentadiene, etc., and the acrylate esters may include: ethyl acrylate, propyl acrylate, butyl acrylate, hexyl acrylate, octyl acrylate, nonyl acrylate, etc.

Unless the conjugated diene and acrylate ester are used in at least 50 wt. % of the rubber trunk polymer, singly or in total, the rubber trunk polymer cannot be provided with a sufficiently low glass-transition temperature, thus resulting in only a small antistatic effect. On the other hand, in excess of 95 wt. %, the addition amount of the polyalkylene oxide monomer is inevitably lowered, so that it becomes impossible to attain the desired ESD property.

The polyalkylene oxide monomer has an alkylene oxide chain bonded to an ethylenically unsaturated group and represented by

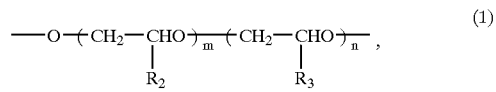

wherein $R_2$ and $R_3$ independently denote hydrogen or an alkyl group having 1–4 carbon atoms; and m and n are integers satisfying $4 \leq m+n \leq 500$; and is particularly preferably one having an ethylene oxide block including at least 4 ethylene oxide groups obtained with at least one of $R_2$ and $R_3$ being hydrogen.

As the polyalkylene oxide monomer, it is preferred to use at least one species of monomer represented by the following structural formula (2) or (3):

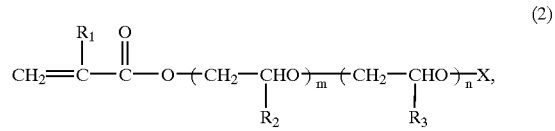

wherein $R_1$ denotes hydrogen or an alkyl group having 1–4 carbon atoms; X denotes hydrogen, an alkyl group having 1–9 carbon atoms, phenyl group, $SO_3Me$, $SO_2Me$, $PO_3Me_2$,

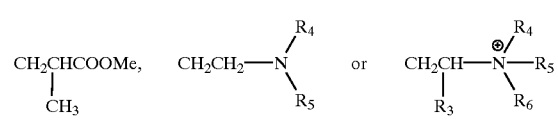

wherein $R_4$, $R_5$ and R, denote hydrogen or an alkyl group having 1–9 carbon atoms; Me denotes hydrogen or an alkaline metal; and R2, R3, m and n have the same meanings as in the formula (1); or

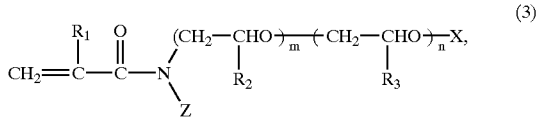

wherein z denotes hydrogen, an alkyl group having 1–40 carbon atoms, a cycloalkyl group having 3–6 carbon atoms, a cycloalkyl group having 3–6 carbon atoms, phenyl group, or

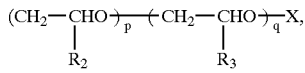

wherein p and q are integers satisfying $4 \leq p+q \leq 500$.

Among the monomers represented by the above-mentioned formula (2) and formula (3), those including at least one of $R_2$ and $R_3$ being hydrogen and having at least 4 ethylene oxide groups are particularly preferably used. It is of course possible to use similar monomers other than those represented by the formula (2) and formula (3) as far as they have an ethylenically unsaturated bond and a polyalkylene oxide unit and can be copolymerized with a conjugated diene or/and an acrylate ester to provide a rubber trunk polymer with a lower volumetric electrical resistivity.

It is necessary to have 4–500 alkylene oxide groups in the polyalkylene oxide monomer, preferably 6–50 groups, particularly preferably 9–50 groups. Below 4 alkylene oxide groups, it is difficult to impart an antistatic effect, and more than 500 groups, the monomer is not easily soluble and also shows poor polymerizability.

Further, if the polyalkylene oxide monomer is not contained at 5 wt. % or higher in the rubber trunk polymer, it is impossible to provide a sufficient antistatic effect. Further, if not below 50 wt. %, it becomes difficult to effect the polymerization for formation of the rubber trunk polymer or in the graft co-polymerization or the post treatment by acid precipitation of the resultant polymer.

As the ethylenically unsaturated monomer copolymerizable with the conjugated diene or acrylate ester and optionally used for producing the rubber trunk polymer, known monomers may be used. For examples, one or more species of monomers may be used, such as methyl acrylate, alkyl methacrylates, acrylic acid, methacrylic acid, acrylamide, vinyl acetate, unsaturated nitriles, aromatic vinyls, alkyl vinyl ethers, alkyl vinyl ketones, 2-hydroxyethyl (meth) acrylate, diacetone acrylamide, vinyl chloride, vinylidene chloride, itaconic acid, alkyl itaconates, isobutene, 2-acidphosphoxyethyl methacrylate, 3-chloro-2-acidphosphoxypropyl methacrylate, and sodium styrenesulfonate. A further enhanced antistatic effect can be attained, if a monomer having a large polarity, such as acrylonitrile, or a monomer having an anionic substituent, such as sulfonic acid group, phosphoric acid group or carboxylic acid group, is used as the above-mentioned ethylenically unsaturated monomer.

Such a copolymerizable ethylenically unsaturated monomer is used within a range of not exceeding 40 wt. % of the rubber trunk polymer. Beyond the range, the rubber trunk polymer is caused to have a high glass transition temperature and lose a rubber characteristic.

For the rubber trunk polymer, it is possible to use a polyfunctional monomer having two or more of at least one species of ethylenically unsaturated groups, such as vinyl group, 1,3-butadienyl group, acryl group, methacryl group and alkyl group, as desired. Particularly, a polyfunctional monomer further having 4–500, preferably 9–50, polyalkylene glycol groups, is preferred since it functions as an antistatic property-imparting agent as well as a crosslinking agent.

The polymerization for the rubber trunk polymer used in the present invention may preferably be performed by emulsion polymerization in the presence of a carboxylic acid-type surfactant. The carboxylic acid-type surfactant effectively functions in acid precipitation with a strong acid, such as hydrochloric acid, described hereinafter, and is also preferred in consideration from environmental aspect compared with other weak acid salt-type surfactants, such as organic phosphoric acid salt-type surfactants inclusive of alkylphosphoric acid salts and alkyl etherphosphoric acid salts. Preferred examples of the carboxylic acid-type surfactant may include: aliphatic acid salts, rosin acid salts, N-acylamino acid salts, alkyl ethercarboxylic acid salts. These carboxylic acid salt-type surfactants may preferably be incorporated in a proportion of 0.5–25 g/l in an aqueous dispersion medium at the time of emulsion polymerization for the rubber trunk polymer.

As the ethylenically unsaturated monomer graftpolymerized onto the rubber trunk polymer, a known monomer may be used. Examples thereof may include: alkyl acrylate, alkyl methacrylates, acrylic acid, methacrylic acid, (meth)acrylamide, vinyl acetate, unsaturated nitrites, aromatic vinyls, conjugated dienes, alkyl vinyl ethers, alkyl vinyl ketones, 2-hydroxyethyl (meth)acrylate, (alkoxy) polyethylene glycol (meth)acrylate, diacetone acrylamide, vinyl chloride, vinylidene chloride, itaconic acid, alkyl itaconates, and isobutene, and at least one species of these monomers may be used. During the graft polymerization, additional aqueous dispersion medium and surfactant may be added as desired. The influence of the surfactant additionally used at this time on the acid precipitation is not so serious as the surfactant used in the emulsion polymerization for the rubber trunk polymer, but the use of a carboxylic acid-type surfactant is still preferred.

As for the ratio between the rubber trunk polymer and the branch polymer in the graft copolymer, the former may be used in 5–95 wt. %, preferably 8–80 wt. %, and the latter may be used in 5–95 wt. %, preferably 20–92 wt. %. If the rubber trunk polymer is less than 5 wt. %, it becomes difficult to impart the antistatic property, and in excess of 95 wt. %, it becomes difficult to obtain a thermoplastic resin composition through thermal mixing with the crystalline thermoplastic resin.

Into the latex of the graft copolymer (B) obtained in the above-described manner, an aqueous solution of a strong acid, preferably hydrochloric acid, is added, thereby precipitating the graft copolymer (B), which is then recovered as solid powder. The latex of the graft copolymer (B) stabilized with the carboxylic acid-type surfactant as described loses its stability as a result of rapid neutralization of the system by the addition under stirring of the strong acid aqueous solution, to be recovered as strongly aggregated solid powder having a low moisture content. For example, effective acid precipitation can be realized by 100–500 wt. parts of hydrochloric acid aqueous solution at a relatively low, concentration of 0.1–2 wt. % to 100 wt. parts of the latex of the graft copolymer (B) at a solid matter concentration of 20–40 wt. %, and the product can be effectively dried by a drier adapted to mass production, such as an airborne-type instantaneous drier or a fluidized bed-type drier to be recovered as a solid powdery form of graft copolymer (B).

The content of the graft copolymer (B) in the thermoplastic resin composition is 15–65 wt. %, preferably 20–65 wt. %, particularly preferably 25–60 wt. %. If the content of the graft copolymer (B) is excessively large, the thermoplastic resin composition is caused to have a lower elasticity modulus, and the processing thereof as by injection molding or extrusion is liable to be difficult in some cases. If the content of the graft copolymer having the rubber trunk polymer is too small, the thermoplastic resin composition is liable to have an insufficient antistatic property.

Anionic Surfactant

As the anionic surfactant (C) used in the present invention, it is preferred to use at least one species of anionic surfactant selected from the group consisting of alkylbenzenesulfonic acid salts, alkyl-naphthalenesulfonic acid salts, perfluoro-alkylsulfonic acid salts, trifluoromethane-sulfonic acid salts, perfluoroalkylcarboxylic acid salts and fatty acid salts. In order to ensure a necessary thermal resistance, it is particularly preferred to use one having a thermal weight loss initiation temperature according to JIS-K7120 (hereinafter sometimes denoted by "Tng") of at least 250° C. The thermal weight loss initiation temperature has been recognized to have some degree of correlation with the structure of an anionic surfactant, and examples of the anionic surfactant having a thermal weight loss initiation temperature of at least 250° C. may include: alkylbenzenesulfonic acid salts, alkylnaphthalene-sulfonic acid salts, aliphatic acid salts, perfloroalkylsulfonic acid salts, trifluoromethane-sulfonic acid salts, and perfluoroalkylcarboxylic acid salts.

The selection of metal species constituting an anionic surfactant also has a relation with the effect of the anionic surfactant also has a relation with the effect of the anionic surfactant as an antistatic agent, and a salt of an alkaline metal having an atomic number of 19 (corresponding to potassium) or larger is preferred so as the shorten the time for blending with the graft copolymer (B) and the crystalline thermoplastic resin (A) and improve the properties of the shaped product, because the addition of a relatively small amount thereof provides a necessary antistatic effect.

The anionic surfactant (C) is used in a proportion of 0.1–5 wt. % in the thermoplastic resin composition of the present invention. Below 0.1 wt. %, the ESD property-improving effect is scarce, and in excess of 5 wt. %, the blending-out to the surface of a shaped product becomes remarkable to provide undesirable properties of the shaped product.

Non-crystalline Thermoplastic Resin

The contents of the above-mentioned components (A)–(C) are defined as propositions in the resinous components in the thermoplastic resin composition of the present invention (and non-resinous fillers described hereinafter are not concerned with the above-mentioned contents). Accordingly, as far as the above-mentioned contents of the components are satisfied and a necessary level of ESD property is maintained, a relatively small amount of non-crystalline thermoplastic resin is allowed to be incorporated.

Fillers

Into the resin composition of the present invention, it is possible to further add various fillers for the purpose of improving the mechanical strength and thermal resistance. Particularly, it is sometimes preferred to incorporate a fibrous reinforcing material, examples of which may include: inorganic fibrous materials, such as glass fiber, carbon fiber, asbestos fiber, silica fiber, alumina fiber, zirconia fiber, boron nitride fiber, silicon nitride fiber, boron fiber, and potassium titanate fiber; metal fibrous materials of, e.g., stainless steel, aluminum, titanium, steel and bronze; and fibrous materials of high melting point organics, such as polyamide, fluorine-containing resin, polyester resin and acrylic resin. Other fillers may for example include: particulate or powdery fillers of, e.g., mica, silica, talc, alumina, kaolin, calcium sulfate, calcium carbonate, titanium oxide, ferrite, clay, glass powder, zinc oxide, nickel carbonate iron oxide, quartz powder, magnesium carbonate and barium sulfate.

Particularly, it is also preferred to incorporate a filler of a relatively good, conductivity, such as metal fiber, metal powder or semiconductor powder so as to provide a shaped product with further lowered surface resistivity. Particularly, as the surface resistivity control in the region of $10^6$–$10^{11}$ ohm/square of which the control is generally difficult has been made possible according to the thermoplastic resin composition of the present invention, it is easy to provide a further lower surface resistivity by inclusion of a good-conductivity filler. However, the lowering of surface resistivity to below 10 ohm/square is not preferred because it is liable to result in a lower product yield due to discharge, etc.

The above-mentioned fillers can be respectively used singly or in combination of two or more species. Further, it is possible that the filler has been treated with a binding agent or a surface-treating agent, as desired. Examples of such a binding agent or a surface-treating agent may include: functional compounds, such as epoxy compounds, isocyanate compounds, silane compounds and titanate compounds. Such a compound may be used for surface-treatment or binding treatment before the use of the filler or may be added simultaneously at the time of preparation of the composition.

Other Additives

The thermoplastic resin composition of the present invention can further contain another additive other than the above, examples of which may include: impact modifiers, such as epoxy group-containing α-olefin copolymers; resin modifiers, such as ethylene glycidyl methacrylate; lubricants, such as pentaerythritol tetrastearate; thermosetting resins; antioxidants, such as phenolic antioxidants and phosphoric acid-type antioxidants; peroxide decomposers, such as sulfur-type or phosphorus-type secondary antioxidants; ultraviolet absorbers; nucleating agents, such as boron nitride; flame-retardant; and colorants, such as dyes and pigments. Particularly, the thermoplastic resin composition of the present invention is non-black in color, and an important characteristic thereof is that it can be colored into arbitrary hues, as desired, by incorporating a colorant, preferably a heat-resistant pigment.

Thermoplastic Resin Composition

The thermoplastic resin composition of the present invention can be prepared by using equipments and methods generally used for preparation of synthetic resin compositions. For example, the respective starting ingredients may be preliminary blended by means of a Hersehel mixer or a tumbler, and optional fillers, such as glass fiber, may be added thereto as desired, followed by extrusion through a single-screw or twin-screw extruder into pellets for molding. It is also possible to use a portion of the necessary components for preparation of a master batch, followed by blending with the remainder of the components, or to pulverize a part of the starting materials for improving the dispersibility of the respective components by uniformizing the particle sizes, followed by blending and melt-extrusion.

Usage

The thermoplastic resin composition of the present invention can be shaped and processed into shaped products, such as sheets, films, tubes, pipes and others, through ordinary melt-forming processing methods, such as injection molding or extrusion. The shaped products can be used in wide fields where antistatic property is required.

Specific usages may include: in the electric or electronic field and semiconductor-related fields, wafer carriers, wafer cassettes, tote bins, wafer boats, IC chip trays, IC chip carriers, IC conveyer tubes, IC cards, tapes, reel packings, various cases, storing trays, storing bins, conveyer parts such as bearings and conveyer belts; in the fields of magnetic card readers and OA apparatus, transfer rollers for recording apparatus, transfer belts, developing rollers, transfer drums for recording apparatus, print circuit board cassettes, liquid crystal glass substrate cassettes, bushings, paper and paper bill-conveyer parts, paper feed rails, font cartridge, ink ribbon canisters, guide bins, trays, rollers, gears, sprockets, computer housings, modem housings, monitor housings, CD-ROM housings, printer housings, connectors, and computer slots;: in the field of communication apparatus, portable telephone accessories, papers, various sliding members; in the field of automobiles, interior trims, underhoods, electric and electronic member housings, gas tank caps, fuel filters, fuel line connectors, fuel line clips, fuel tanks, device bezeles, door handles, and various parts; and in other fields, wire and electric cable coatings, wire supports, electric wave absorbers, floorings, carpets, mothproofing sheets, pallets, shoe soles, tapes, bushes and blower fans.

EXAMPLES

Hereinbelow, the present invention will be described more specifically based on Examples. Incidentally, "part(s)" used in Examples means "part(s) by weight" and physical properties described were measured according to methods described representatively below.

(1) Surface Resistivity

Measured according to JIS K6911. The outline thereof is as follows.

An electroconductive part ("Dotite D-550", made by Fujikura Kasei K.K.) was applied onto both front and back surfaces of a molded test piece (measuring 100 mm×127 mm×3mm-thickness) to form electrodes thereon. More specifically, the electrode on the front surface comprised an inner circle having a diameter of 50 mm and an annular ring having an inner diameter of 70 mm and an outer diameter of 83 mm. The measurement was performed by applying a voltage of 100 volts between the inner circle and the annular ring of the electrode on the front surface while using the electrode on the back surface as a guard electrode to measure a resistance between the inner circle and the annular ring, and a surface resistivity was calculated from the resistance according to a prescribed formula.

(2) Evaluations of Static Decay Time.

Measured according to MIL-B-81705. The outline of the measurement is as follows.

The apparatus used was "STATIC DECAY METER-406C" (made by Electro-Tech Systems, Inc.). A voltage of 5000 volts was applied to a molded test piece (flat sheet of 100 mm×127 mm×3 mm-thickness), and a time after removal of the voltage in which the potential of the test piece was lowered to 50 volts was measured as a static decay time. A shorter static decay time represents a better antistatic effect.

Production of Graft Copolymer

Into a pressure-resistant reaction vessel equipped with a stirrer, a thermometer and a pressure gauge, 23 parts of 1,3-butadiene, 30 parts of butyl acrylate, 12 parts of methoxypolyethylene glycol methacrylate, 0.016 part of diisopropylbenzene hydroperoxide, 0.006 part of formaldehyde sodium sulfoxylate, 0.0015 part of iron (III) ethylenediamine-tetraacetate, 0.2 part of sodium pyrophosphate, 2.0 parts of potassium oleate and 200 parts of deionized water, were charged and stirred at 60° C. for 10 hours, whereby a rubber trunk polymer of 80 nm in average particle size was obtained at a yield of 99%.

To the above-obtained latex of rubber trunk polymer containing 65 parts of solid matter, an ethylenically unsaturated monomer mixture including 35 parts of methyl methacrylate, 0.3 part of normal-octyl mercaptan, 0.018 part of diisopropylbenzene hydroperoxide, 0.007 part of formaldehyde sodium sulfoxylate and 1.0 part of potassium oleate, and 50 parts of deionized water, were added, and after nitrogen substitution, the system was subjected to graft copolymerization under stirring at 60° C. for 10 hours. The resultant latex was taken out and precipitated by adding 200 parts of aqueous hydrochloric acid solution at a concentration of 0.7 wt. %. After dewatering and washing, a powder graft copolymer having a moisture content of 43 wt. % was obtained. The copolymer was dried by means an airborne instantaneous drier at a hot air temperature of 100° C. to obtain a white powdery graft copolymer at a yield of 97%.

Examples 1–14 and Comparative Examples 1–3

The above-obtained graft copolymer and thermoplastic resins and an anionic surfactant (and glass fiber in some cases) shown below, were uniformly blended in ratios shown in Table 1 appearing hereinafter and supplied to a kneading extruder ("BT-30", made by Plastic Kogaku Kenkyusho) for melt-kneading to obtain pelletized products. Each pelletized product, after drying, was shaped by means of an injection molding machine ("IS-75",, made by Toshiba Kikai K.K.) into flat sheet samples, which were subjected to the measurement of surface resistivity and static decay time. The cylinder temperature of the extruder was adjusted to different temperatures depending on the species of the thermoplastic resins used, such as 230–250° C. for PBT and PA 6, 260–280° C. for PET, 205–225° C. for PP, 190–200° C. for POM alone and in mixture with TPU, 180–200° C. for PMMA and PS, 280–300° C. for PC, and 200–250° C. for PVDF.

Thermoplastic Resins
(Crystalline Thermoplastic Resins)

PBT: polybutylene terephthalate ("DURANEX", made by Polyplastics K.K.; Tm (melting point)=226° C., ΔHc (crystalline melting enthalpy)=50 J/g), PET: polyethylene terephthalate ("PYROPET", made by Toyobo K.K.; Tm=252° C., ΔHc=57 J/g), PA6: nylon 6 ("UBE Nylon", made by Ube Kosan K.K.; Tm=225° C., ΔHc=95 J/g), PP: polypropylene ("NOVATEX PP", made by Nippon Polychem K.K.; Tm=169° C., ΔHc=93 J/g), POM: polyacetal ("DURACON", made by Polyplastics K.K.; Tm=165° C., ΔHc=140 J/g), PVDF: polyvinylidene fluoride ("KF Polymer", made by Kureha Kagaku Kogyo K.K.; Tm=177° C., ΔHc=56 J/g)

(Amorphous Thermoplastic Resin)

PMMA: polymethyl methacrylate ("SUMIBEX", made by Sumitomo Kagaku K.K.; ΔHc=0 J/g)

PS: polystyrene ("STYRON", made by Asahi Kasei K.K.; ΔHc=0 J/g)

PC: polycarbonate ("LEXANE", made by Teijin Kasei K.K.; ΔHc=0 J/g)

TPU: thermoplastic polyurethane ("KURAMILON", made by Kuraray K.K.; ΔHc=0 J/g)

Anionic Surfactant

Potassium dodecylbenzenesulfonate (thermal weight loss initiation temperature (JIS-K7120)=430° C.)

Glass Fiber

"E Glass", made by Nippon Denki Glass K.K.; diameter=13 μm).

of Comparative Examples, so that it is understood that the ESD property has been realized.

INDUSTRIAL APPLICABILITY

As described above, according to the present invention, a non-black thermoplastic resin composition suitable for use as an ESD (electrical static dissipative) material and capable of being colored into arbitrary hues is provided by incorporating a crystalline thermoplastic resin (A) in combination with a graft copolymer (B) and an anionic surfactant (C).

What is claimed is:

1. A non-black, thermoplastic resin composition comprising: (A) 30–84.9 wt. % of a crystalline thermoplastic resin, (B) 15–65 wt. % of a graft-copolymer formed by graft-polymerizing an ethylenically unsaturated monomer onto a rubber trunk polymer having a polyalkylene oxide group and (C) 0.1–5 wt. % of an anionic surfactant.

2. The thermoplastic resin composition according to claim 1, comprising 30–79.9 wt. % of the crystalline thermoplastic resin (A), 20–65 wt. % of the graft-copolymer (B) and 0.1–5 wt. % of the anionic surfactant (C).

3. The thermoplastic resin composition according to claim 1, wherein the rubber trunk polymer (B) has been obtained by using a carboxylic acid-type surfactant as an emulsifier for polymerization.

4. The thermoplastic resin composition according to claim 1, wherein the anionic surfactant (C) has a thermal weight loss initiation temperature of at least 250° C.

5. The thermoplastic resin composition according to claim 1, wherein the polyalkylene oxide group of the rubber trunk polymer in the graft-copolymer (B) has 4–500 alkylene oxide groups.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| <Composition (wt. parts)> | | | | | | | | | | |
| thermoplastic resin | PBT 59 | PBT 49.5 | PBT 40 | PET 49.5 | PA6 49.5 | PP 49.5 | POM 49.5 | POM 74 | POM 79 | POM 69 |
| graft copolymer | 40 | 49.5 | 34 | 49.5 | 49.5 | 49.5 | 49.5 | 25 | 20 | 30 |
| anionic surfactant | 1 | 1 | 1 | 1 | 1 | 1 | 1 | 1 | 1 | 1 |
| glass fiber | 0 | 0 | 25 | 0 | 0 | 0 | 0 | 0 | 0 | 0 |
| total | 100 | 100 | 100 | 100 | 100 | 100 | 100 | 100 | 100 | 100 |
| <Evaluation> | | | | | | | | | | |
| static decay time (5000 V–50 V) (sec.) | 0.08 | 0.04 | 0.12 | 0.04 | 0.06 | 0.04 | 0.02 | 1.86 | 1.09 | 0.13 |
| surface resistivity (Ω/□) | $1 \times 10^{10}$ | $1 \times 10^{10}$ | $1 \times 10^{10}$ | $8 \times 10^{9}$ | $8 \times 10^{9}$ | $1 \times 10^{10}$ | $4 \times 10^{9}$ | $8 \times 10^{11}$ | $4 \times 10^{11}$ | $4 \times 10^{10}$ |

| | | Example | | | | Comparative Example | | |
|---|---|---|---|---|---|---|---|---|
| | | 11 | 12 | 13 | 14 | 1 | 2 | 3 |
| | <Composition (wt. parts)> | | | | | | | |
| | thermoplastic resin | POM 69 TPU 10 | POM 59 TPU 20 | PVDF 59 | PVDF 79 | PMMA 49.5 | PS 49.5 | PC 53 |
| | graft copolymer | 20 | 20 | 40 | 20 | 49.5 | 49.5 | 46 |
| | anionic surfactant | 1 | 1 | 1 | 1 | 1 | 1 | 1 |
| | glass fiber | 0 | 0 | 0 | 0 | 0 | 0 | 0 |
| | total | 100 | 100 | 100 | 100 | 100 | 100 | 100 |
| | <Evaluation> | | | | | | | |
| | static decay time (5000 V–50 V) (sec.) | 0.17 | 0.05 | 0.12 | 1.18 | 18 | 12 | 11 |
| | surface resistivity (Ω/□) | $6 \times 10^{10}$ | $8 \times 10^{9}$ | $5 \times 10^{9}$ | $8 \times 10^{10}$ | $3 \times 10^{11}$ | $5 \times 10^{12}$ | $9 \times 10^{10}$ |

As shown in the above Table 1, the shaped products (of Examples 1–14) obtained from thermoplastic resin compositions according to the present invention using crystalline thermoplastic resins exhibited a remarkably shorter static decay time compared with the shaped products (of Comparative Examples 1–3) obtained by using amorphous thermoplastic resins, thus showing a clear difference in antistatic effect. Also, as for the surface resistivity, Examples exhibited values which were smaller by about one digit than those 6. A non-black thermoplastic resin composition, comprising (A) a crystalline thermoplastic resin, (B) a graft-copolymer having a rubber trunk polymer and (C) an anionic surfactant, and providing a shaped article exhibiting a static decay time from 5000 volts to 50 volts of at most 10 sec. and a surface resistivity of at least 10 ohm/square.

7. A thermoplastic resin composition according to claim 1, further including a fibrous reinforcing material.

8. A thermoplastic resin composition according to claim 2, further including a fibrous reinforcing material.

9. A thermoplastic resin composition according to claim 6, further including a fibrous reinforcing material.

10. The thermoplastic resin composition according to claim 1, wherein the crystalline thermoplastic resin (A) has a crystal melting enthalpy (ΔHc) of at least 10 J/g.

11. A thermoplastic resin composition according to claim 6, wherein the crystalline thermoplastic resin (A) has a crystal melting enthalpy (ΔHc) of at least 10 J/g.

* * * * *